United States Patent [19]

Korth

[11] Patent Number: 4,550,750

[45] Date of Patent: Nov. 5, 1985

[54] HYDRAULIC FLUID DISTRIBUTOR

[75] Inventor: Jürgen Korth, Hanover, Fed. Rep. of Germany

[73] Assignee: P.A. Rentrop Hubbert & Wagner Fahrzeugausstattungen GmbH & Co. KG, Fed. Rep. of Germany

[21] Appl. No.: 651,340

[22] Filed: Sep. 17, 1984

[30] Foreign Application Priority Data

Sep. 17, 1983 [DE] Fed. Rep. of Germany ....... 3333745

[51] Int. Cl.⁴ ............................................. F16K 11/10
[52] U.S. Cl. ................................... 137/868; 137/269; 137/636.1; 137/867; 137/883
[58] Field of Search ............... 137/269, 565, 635, 636, 137/636.1, 867, 868, 883, 881; 251/239

[56] References Cited

U.S. PATENT DOCUMENTS

| | | | |
|---|---|---|---|
| 763,827 | 6/1904 | Williamson | 137/636 X |
| 2,164,232 | 6/1939 | Downey | 137/636 X |
| 2,420,588 | 5/1947 | Sunnihoo | 251/239 X |
| 2,639,729 | 5/1953 | Tulumello et al. | 251/239 X |
| 3,512,553 | 5/1970 | Legris | 137/635 |
| 4,421,135 | 12/1983 | Harshman et al. | 137/868 X |

Primary Examiner—A. Michael Chambers
Assistant Examiner—John C. Fox
Attorney, Agent, or Firm—Penrose Lucas Albright

[57] ABSTRACT

A pressurized medium distributor device has a respective push rod valve between the common inlet and each outlet. The push rod valves can be opened against a spring force by operation of an actuating member so that pressure medium connection can be made between the distributor line and the relevant actuated pressurized medium outlet connection or connections.

6 Claims, 6 Drawing Figures

HYDRAULIC FLUID DISTRIBUTOR

BACKGROUND OF THE INVENTION

Technical Field

The present invention relates to a distributor device for distributing pressurised medium selectively from an inlet line to one or more pressure cylinders.

SUMMARY OF THE INVENTION

An object of the invention is to construct a distributor device that is simple in construction and extremely simple to operate.

The present invention provides a distributor device for pressurized medium, including a pressurised medium inlet connection, a distributor line connected to said inlet connector, a plurality of adjacently disposed pressurised medium outlet connections adapted to be connected to a corresponding plurality of pressure cylinders via lines, a plurality of valves of a push-rod type, and actuating means adapted to be operable to open each said valve against a spring force, each said valve being associated with at least one said pressure medium outlet connection, each said valve when actuated into an open condition permitting pressurised medium connection between said distributor line and said associated pressurised medium outlet connection(s). Preferably the actuating member is a member pivotable about an axis of rotation.

According to a preferred embodiment, the actuating member is the housing of a pump which has a discharge line connected to the distributor line.

Advantageously each said actuating member has a projecting portion which is adapted to be applied against the head of the push rod of the relevant push rod valve.

It is convenient if the heads of adjacent push rods of the push rod valves have projections arranged such that the distance between the projections is very small. Thus it is possible to actuate two push rods and therefore two push rod valves simultaneously.

The invention further provides a distributor device including a housing having an inlet connection and a plurality of outlet connections, a plurality of valves in said housing, means defined in said housing for connecting said inlet connection to each of said valves and a respective said outlet connection with each said valve, each valve having a push rod having a head, each said push rod being biased into such a position as to block fluid communication across said valve, and an actuating member pivotable so as to be able to engage any selected said head and thereby move said push rod into a position whereby fluid can flow from said inlet connection to said associated outlet connection.

DESCRIPTION OF PREFERRED EMBODIMENTS

Figure 1:
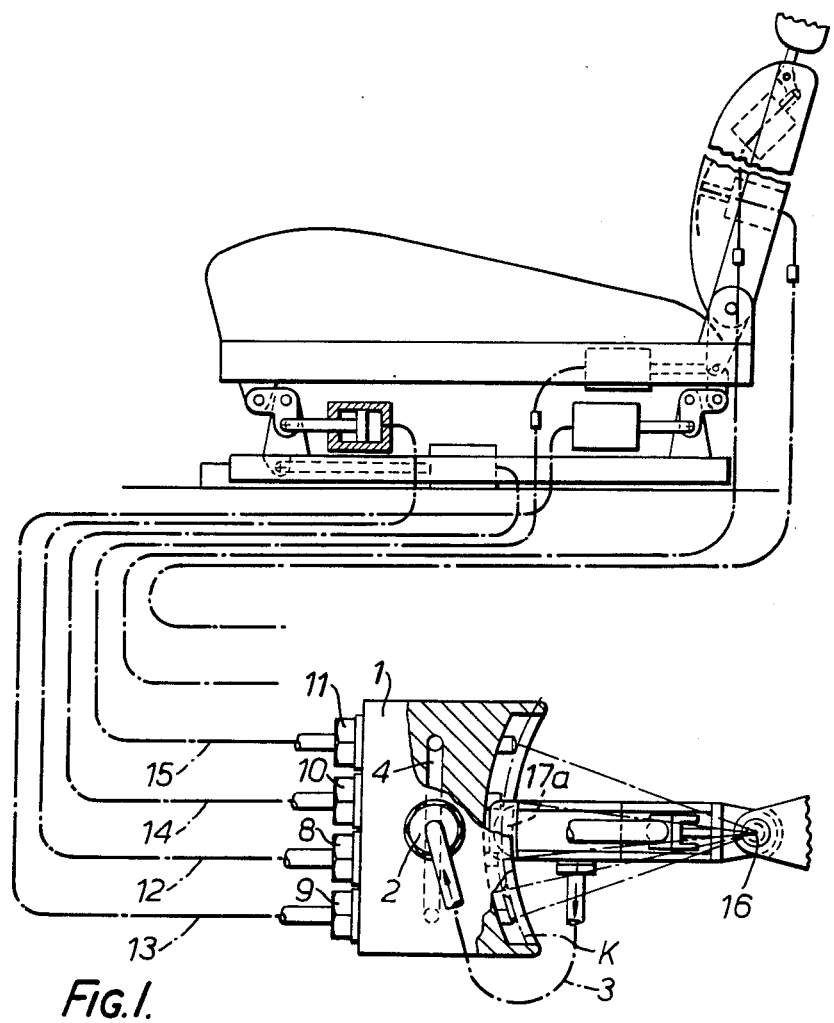
FIG. 1 shows a partly sectional plan view of a pressurised medium distributor device according to the invention, the pressurised medium outlet connections being connected via pipes to pressure cylinders to operate seat, back rest and head support adjustments for a motor vehicle seat shown in elevation.
Figure 2:
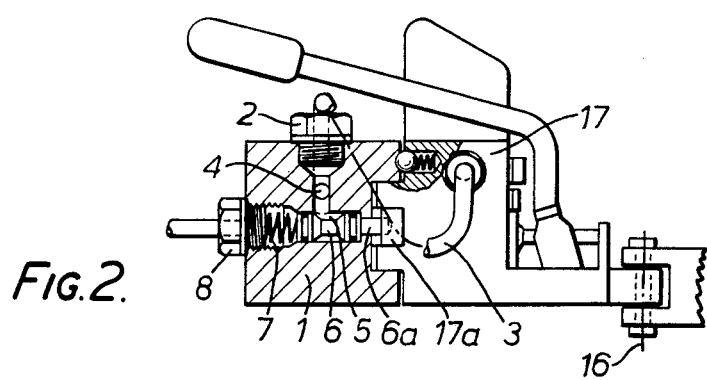
FIG. 2 is a partly sectional elevation of the pressurised medium distributor of FIG. 1.

Referring initially to FIGS. 1 and 2, a pressurised medium distributor device has a housing 1. A pressurised medium inlet connection 1 in the housing is connected by a line 3 to a source of pressurised medium.

A distributor line 4 is provided in the housing 1 and is connected via corresponding feeder lines to horizontal bores 5 in which push rod valves are displaceably mounted. FIG. 2 of the drawings shows only one such valve 6. The valve 6 has a push rod 6a. The push rod valves, e.g. 6, are subject to the action of thrust springs, e.g. 7, which bias the valves, e.g. 6, into the closed condition, in which the connection between the distributor line 4 and the associated pressurised medium outlet connection, e.g. 8, is broken. As illustrated, there are four pressurised medium outlet connections 8 to 11, but the invention is not limited to this number. Communicating with the pressurised medium outlet connections 8 to 11 are respective lines 12 to 15, which are connected for example to pressurised cylinders for operating the seat, back rest and head support adjusting means of a vehicle seat.

By operating the push rod valves, e.g. 6, against the force of the springs, e.g. 7, it is possible to establish a connection between the distributor line 4 and the relevant pressurised medium outlet connection, e.g. 8.

In the case of the embodiment shown in FIGS. 1 and 2, the actuating member provided is the housing of a manually operable pump 17 which is pivotable about an axis of rotation 16 to align it with any selected valve. The discharge line 3 of the pump is connected to the distributor line 4 via the pressurised medium inlet connection 2. On that side of the housing of the pump 17 which faces towards the push rods of the valves, e.g. 6a, there is a projecting portion 17a which can be applied against the head of the push rod, e.g. 6a, of the selected push rod valve, e.g. 6.

Figure 3:
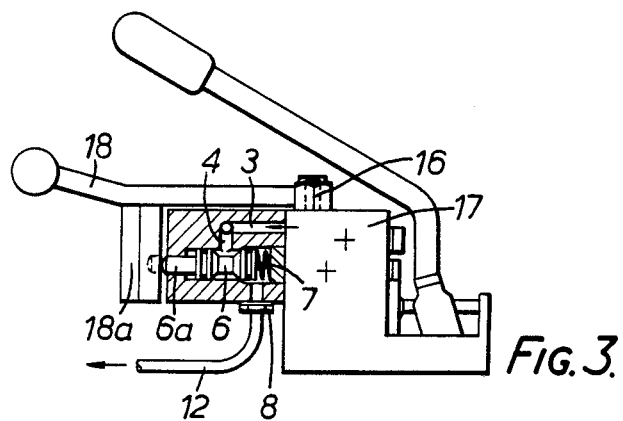
FIG. 3 is a partly sectional elevation of a further embodiment of pressurised medium distributor according to the invention.
Figure 4:
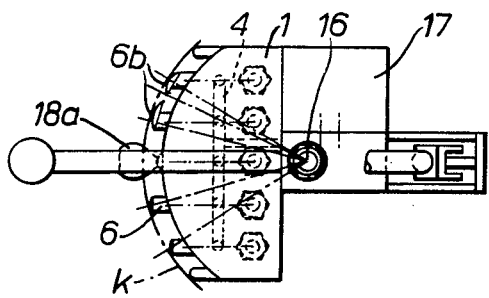
FIG. 4 is a plan view of the device shown in FIG. 3.
Figure 5:
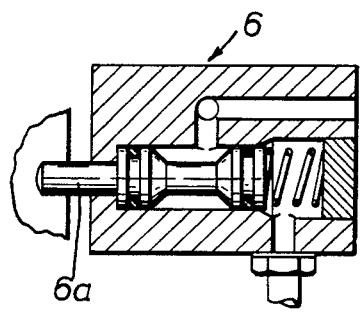
FIG. 5 is a sectional view through a push rod valve for use in the device of FIGS. 3 and 4 in a closed condition.
Figure 6:
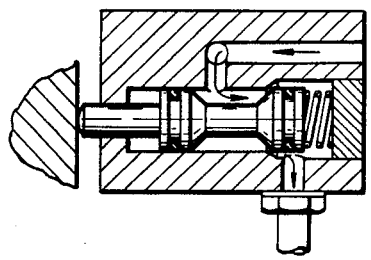
FIG. 6 is a view similar to FIG. 5 showing the valve in an open condition.

In the case of the embodiment shown in FIGS. 3 and 4, the actuating member is a lever 18 pivotable about the axis of rotation 16. The lever 18 has a projecting portion 18a which, in the switching position, bears against the corresponding push rod, e.g. 6a, of the push rod valve, e.g. 6. The effect of the portion 18a acting on the push rod head is to overcome the force of the spring 7 and cause the push rod valve 6 to move into an open condition where the distributor line 4 is caused to communicate with the pressurised medium outlet connection e.g. 8, so that the line 12 can be subjected to the action of pressurised medium. The pressurised medium is fed to the distributor line of the manually operable pump 17. A detail of a push rod valve as used in this embodiment is shown in FIGS. 5 and 6. In FIG. 5 the push rod is shown biased into its normal closed condition whereas in FIG. 6 the actuating member engages the head of the push rod to place the valve in an open condition permitting pressure medium flow as shown by the arrows.

In both embodiments, the heads of the push rods, e.g. 6a, of the push rod valves, e.g. 6, lie on a circular line k, the central point of which is the axis of rotation 16.

As illustrated in the embodiment shown in FIGS. 3 and 4, each of the heads of two adjacent push rods has a projecting portion 6b directed towards each other. The gap between the projecting portions 6b is relatively small so that the projecting portion 18a of the actuating member can simultaneously operate both push rods so that two lines, e.g. the lines 12 and 13, can be subjected to the action of pressurised medium. This modification could naturally also be made in the embodiment shown in FIGS. 1 and 2.

It will be appreciated that the described device is extemely simple in construction and operation and furthermore makes it possible optionally to connect pressure medium simultaneously to two or more discharge or pressurised lines.

I claim:

1. A distributor device for pressurised medium, including a pressurised medium inlet connection, a distributor line connected to said inlet connection, a plurality of adjacently disposed pressurised medium outlet connections adapted to be connected to a corresponding plurality of pressure cylinders via lines, a corresponding plurality of valves of a push-rod type, and actuating means adapted to be operable to open each said valve against a spring force, a pump having a housing and a discharge line connected to said distributor line via said inlet connection, said actuating means being the housing of said pump, each said valve being associated with a respective one of said pressure medium outlet connections, each said valve when actuated into an open condition permitting pressurised medium connection between said distributor line and said associated pressurised medium outlet connection.

2. A distributor device according to claim 1, in which said pump housing actuating means includes a member adapted to pivot about an axis of rotation.

3. A distributor device according to claim 2, in which each push rod valve has a push rod having a head acted on by said actuating member, and in which said actuating member includes a projecting portion adapted to be applied against said head.

4. A distributor device according to claim 3, in which said heads of said push rods of the push rod valves lie on a circular line, the centre point of which is the axis of rotation of said actuating member.

5. A distributor device according to claim 3 or 4, in which each of the heads of two adjacent push rods of two said push rod valves has a projection, the distance between these projections being very small such that said actuating member can actuate both valves simultaneously.

6. A distributor device including a housing having an inlet connection and a plurality of outlet connections, a plurality of valves in said housing, means defined in said housing for connecting said inlet connection to each of said valves and a respective said outlet connection with each said valve, each valve having a push rod having a head, each said push rod being biased into such a position as to block fluid communication across said valve, and a pump having a discharge line connected to said inlet connection and having a housing which is pivotable so as to be able to engage any selected said head and thereby move said push rod into a position whereby fluid can flow from said inlet connection to said associated outlet connection.

* * * * *